United States Patent
Torfs et al.

(10) Patent No.: US 11,594,229 B2
(45) Date of Patent: Feb. 28, 2023

(54) APPARATUS AND METHOD TO IDENTIFY A USER BASED ON SOUND DATA AND LOCATION INFORMATION

(71) Applicant: Sony Corporation, Tokyo (JP)

(72) Inventors: Dimitri Torfs, Stuttgart (DE); Conor Aylward, Stuttgart (DE); Hugo Embrechts, Stuttgart (DE)

(73) Assignee: SONY CORPORATION, Tokyo (JP)

( * ) Notice: Subject to any disclaimer, the term of this patent is extended or adjusted under 35 U.S.C. 154(b) by 662 days.

(21) Appl. No.: 16/498,502

(22) PCT Filed: Mar. 28, 2018

(86) PCT No.: PCT/EP2018/058024
§ 371 (c)(1),
(2) Date: Sep. 27, 2019

(87) PCT Pub. No.: WO2018/178207
PCT Pub. Date: Oct. 4, 2018

(65) Prior Publication Data
US 2020/0035248 A1 Jan. 30, 2020

(30) Foreign Application Priority Data
Mar. 31, 2017 (EP) .................................. 17164215

(51) Int. Cl.
| | | |
|---|---|---|
| *G10L 17/22* | (2013.01) |
| *G10L 17/00* | (2013.01) |
| *G10L 25/51* | (2013.01) |
| *G01S 5/00* | (2006.01) |
| *G01S 5/28* | (2006.01) |
| *G01S 5/18* | (2006.01) |

(Continued)

(52) U.S. Cl.
CPC ............ *G10L 17/22* (2013.01); *G01S 5/0045* (2013.01); *G01S 5/18* (2013.01); *G06V 40/172* (2022.01); *G10L 17/00* (2013.01); *H04W 4/029* (2018.02)

(58) Field of Classification Search
CPC ......... G10L 17/22; G10L 17/00; G10L 25/51; G01S 5/0045; G01S 5/18; G01S 5/28; G06V 40/172; H04W 4/029; G06F 2221/2111; G06F 21/32
USPC ........................................................ 704/246
See application file for complete search history.

(56) References Cited

U.S. PATENT DOCUMENTS

| | | | |
|---|---|---|---|
| 6,988,070 B2 * | 1/2006 | Kawasaki ............... | G10L 15/26 704/E15.045 |
| 9,554,091 B1 * | 1/2017 | Malegaonkar ......... | H04N 7/152 |

(Continued)

FOREIGN PATENT DOCUMENTS

| | | |
|---|---|---|
| CN | 106328132 A | 1/2017 |
| KR | 10-2013-0039578 A | 4/2013 |

OTHER PUBLICATIONS

International Search Report and Written Opinion dated Jun. 20, 2018 for PCT/EP2018/058024 filed on Mar. 28, 2018, 8 pages.

(Continued)

*Primary Examiner* — Inder P Mehra
(74) *Attorney, Agent, or Firm* — Xsensus LLP (57) ABSTRACT

An apparatus has circuitry which determines a location of a user, based on sound data representing speech of the user, and identifies the user based on the determined location of the user and user identification information and location information received from a mobile device.

20 Claims, 8 Drawing Sheets

(51) Int. Cl.
   *G06V 40/16* (2022.01)
   *H04W 4/029* (2018.01)
   *G06F 21/32* (2013.01)

(56) References Cited

U.S. PATENT DOCUMENTS

| | | |
|---|---|---|
| 2013/0173266 A1 | 7/2013 | Nishino et al. |
| 2015/0179050 A1 | 6/2015 | Katingar et al. |
| 2016/0014534 A1* | 1/2016 | Sheen ............... H04R 29/007 |
| | | 381/59 |
| 2016/0125880 A1 | 5/2016 | Zhang et al. |
| 2016/0180222 A1 | 6/2016 | Sierhuis et al. |
| 2017/0245125 A1* | 8/2017 | Child ................... H04W 4/12 |

OTHER PUBLICATIONS

Microsoft, "Microsoft Indoor Localization Competition—IPSN 2016", Vienna, Austria, Apr. 10-11, 2016, pp. 1-3.

Costa et al., "A Mobile Virtual Butler to Bridge the Gap between Users and Ambient Assisted Living: A Smart Home Case Study", Sensors, ISSN 1424-8220, Aug. 6, 2014, pp. 14302-14329.

Giroux et al., "A Multiagent Approach to Personalization and Assistance to Multiple Persons in a Smart Home", Artificial Intelligence Applied to Assistive Technologies and Smart Environments, pp. 11-15.

"Sound localization", Wikipedia, pp. 1-11.

* cited by examiner

APPARATUS AND METHOD TO IDENTIFY A USER BASED ON SOUND DATA AND LOCATION INFORMATION

CROSS-REFERENCE TO RELATED APPLICATIONS

The present application is based on PCT filing PCT/EP2018/058024, filed Mar. 28, 2018, which claims priority to EP 17164215.0, filed Mar. 31, 2017, the entire contents of each are incorporated herein by reference.

TECHNICAL FIELD

The present disclosure generally pertains to an apparatus and a method in the general field of identifying a user based on speech.

TECHNICAL BACKGROUND

Known (home) agent devices are becoming more and more popular and such devices are typically voice controlled for taking over easy tasks, e.g. for switching lights on/off, playing music, purchasing items over an internet shop, etc.

However, for voice control of such devices, the user should be identified, for example in cases where a purchase is made, personal information is accessed or the like.

Although there exist techniques for voice controlling of devices, it is generally desirable to improve apparatus and methods using voice control.

SUMMARY

According to a first aspect the disclosure provides an apparatus comprising circuitry configured to determine a location of a user, based on sound data representing speech of the user; and identify the user based on the determined location of the user and user identification information and location information received from a mobile device.

According to a second aspect the disclosure provides a method comprising determining a location of a user, based on sound data representing speech of the user; and identifying the user based on the determined location of the user and user identification information and location information received from a mobile device.

Further aspects are set forth in the dependent claims, the following description and the drawings.

BRIEF DESCRIPTION OF THE DRAWINGS

Embodiments are explained by way of example with respect to the accompanying drawings, in which:

FIG. 2 (a) schematically illustrates the agent apparatus of FIG. 1;

FIG. 2 (b) schematically illustrates the wearable device of FIG. 1;

DETAILED DESCRIPTION OF EMBODIMENTS

Figure 1:
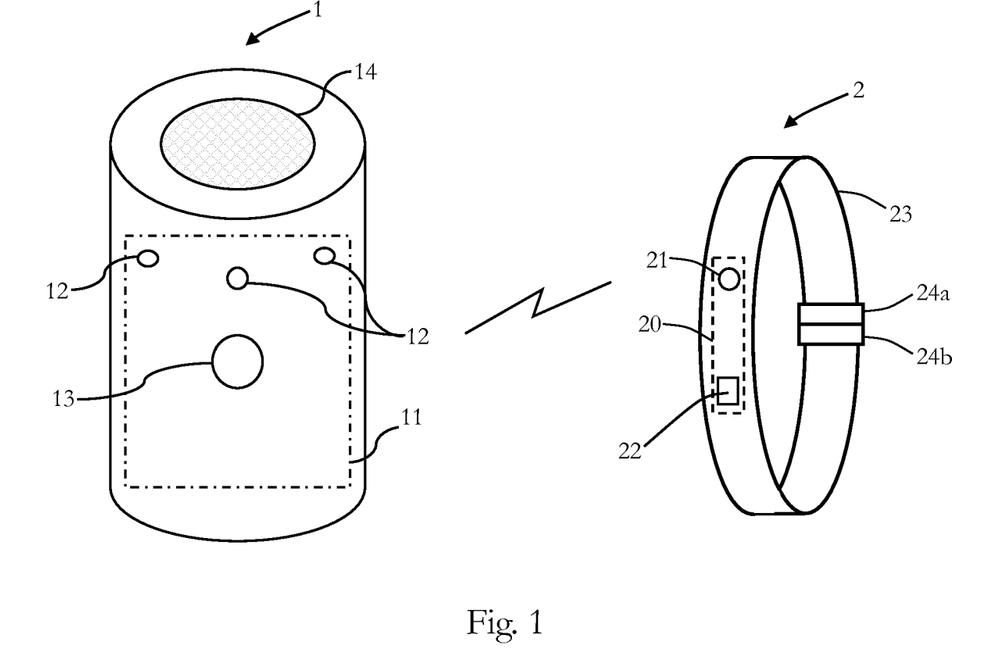
FIG. 1 illustrates an embodiment of an agent apparatus and a wearable device in accordance with the present disclosure.

Before a detailed description of the embodiments under reference of FIG. 1 is given, general explanations are made.

As mentioned in the outset, generally (home) agent devices are known, which are voice controlled for taking over easy tasks, e.g. for switching lights on/off, playing music, purchasing items over an internet shop, etc.

It has been recognized, for improved usability, e.g. such agents should be able to identify who is talking to them, such that a reaction in a personal way is possible. For instance, a user "Tom" may ask "what's on my agenda today?" and then it should be known that Tom's agenda should be checked.

Although speaker recognition is used in some embodiments for user identification, based on speech data, it has also been recognized that there are circumstances in which speaker recognition alone might not be able to distinguish between two or more users, since speaker recognition may not be reliable in the sense that it is possible to identify a user with a high probability (e.g. over 95%, or 100%) purely based on speech of the user.

Consequently, some embodiments pertain to an apparatus including circuitry configured to determine a location of a user, based on sound data representing speech of the user; and identify the user based on the determined location of the user and user identification information and location information received from a mobile device. In some embodiments, the circuitry is further configured to associate at least one user identification with the determined location of the user, based on the sound data, and wherein the user is identified by comparing the at least one user identification and the determined location of the user with the user identification information and the location information received from the mobile device.

The apparatus may be an (home) agent apparatus, it may be an electronic device, e.g. a smartphone, a personal computer, a tablet computer or the like, it may be a server device/computer, it may be located in one device, it may be distributed between two or more device, it may be a remote computer (cloud), etc.

The circuitry may include a processor, a memory (RAM, ROM or the like), a storage, input means (mouse, keyboard, camera, etc.), output means (display (e.g. liquid crystal, (organic) light emitting diode, etc.), loudspeakers, etc., a (wireless) interface, etc., as it is generally known for electronic devices (computers, smartphones, etc.). Moreover, it may include sensors for sensing audio (e.g. one or more microphones), for sensing still image or video image data (image sensor, camera sensor, video sensor, etc.), for sensing a fingerprint, for sensing environmental parameters (e.g. humidity, light, temperature), etc.

As mentioned, the circuitry is configured to determine a location of a user, based on sound data (or voice data) representing speech of the user. The sound data may be generated by the circuitry, e.g. by receiving sound waves originating from the user in the vicinity of the apparatus producing speech, e.g. by saying a command. The sound data may be received over one or more microphones of the apparatus, or coupled to the apparatus. The microphones may also be arranged in an array, a linear structure or the like, such that they are able, for example, to determine different delay times of sound waves originating from the user.

The sound data may also be provided by a sound recording device or the like which provides the sound data to the apparatus.

The circuitry is able to determine the location of the user, based on the sound data, which may include determining a direction and/or a distance of the user. The determination of a location of a sound source is also known as sound localization or acoustic source localization.

The direction of the user may be determined, for example, based on different delay times of the sound waves emitted by the user saying a command and thereby producing speech, also known as time difference of arrival method. The different delay times may be determined based on two or more microphones having a known distance from each other. In the case of microphone arrays, beamforming techniques may be used, as it is generally known.

The determination of the distance and/or direction may involve, for example, the determination of directly and indirectly received sound waves, wherein the directly received sound waves are not reflected, e.g. at a wall, wherein the indirect sound waves are reflected (at least once) by a wall. The ratio between directly received sound waves and reflected sound waves may indicate the distance of the sound source, i.e., the user producing the sound waves when speaking, e.g. saying a command.

The determination of the distance and/or direction may involve determining the loudness of the speech in the sound data, since a sound source (i.e. user) closer to the apparatus might be louder than a sound source (i.e. user) which is more distant.

The determination of the distance and/or direction may involve an analysis of the sound spectrum represented by the sound data, since high frequencies are more quickly dampened by the air than low frequencies, hence, the more distant the sound source (i.e. the user) is, the less the intensity of high frequencies will be.

Moreover, a method referred to as ITDG (The Initial Time Delay Gap) may be used, which is based on the time difference between arrival of the direct sound wave and arrival of the first strong reflection of the sound wave at the apparatus. A nearby sound source, i.e. user, may create a relatively large ITDG, since the first reflections may have a longer path to take than in cases where the sound source is further away from the apparatus, where direct sound waves and the reflected sound waves may have similar path lengths.

Furthermore, similar to visual systems, also in acoustical perception the phenomenon of motion parallax exists, which means that for the apparatus a moving sound source, which is closer moves faster than a more distant sound source (assuming that both sound sources have the same velocity).

Furthermore, the circuitry may determine the distance/direction of a user (sound source), based on machine learning by training, for example, which speech samples of a specific user at different, predefined locations (directions and/or distances) travel to the apparatus, in particular in cases where the apparatus is (at least temporarily) stationary. As typically the room, where the apparatus is located, has a predefined influence on the sound waves due to the structures and the materials in the room (i.e. the room has a predefined acoustical property), the machine learning algorithm (neural network, Bayesian network, or the like), may learn the influence of the room's acoustical property on the sound waves in dependence of the location within the room.

All those techniques and additional ones, which are not mentioned, can be used alone or in any combination with each other.

The circuitry associates at least one user identification with the determined location of the user, based on the sound data. The circuitry may have one or more user identifications stored, e.g. as user profiles, wherein each user identification is unique for a specific user. The user identifications may be generated by registering a user in the apparatus (e.g. based on his user name, date of birth, place of birth, gender, etc. as generally known).

Moreover, the circuitry may be able to perform some kind of speaker recognition, based on the sound data. The speaker recognition may involve detection of characteristics of a voice, also referred to as voice biometrics, as generally known. The sound data representing the speech of the user may be analyzed for detection of such characteristics of a voice. If such characteristics are found, they can be associated with one or more user identifications, which are either already stored in and known to the apparatus or which may also be newly created. Moreover, the detected voice characteristics may be compared with stored characteristics of a voice of a known, e.g. registered user. Hence, in some embodiments, for each known user, associated voice characteristics are stored, such that a user might be identified based on the voice characteristics.

However, as also indicated above, speaker recognition might not be perfect, such that, for example, two or even more user identifications are found by the apparatus. Hence, it might happen that two or more user identifications are associated with the determined location of the user, based on the sound data.

The circuitry identifies the user by comparing the at least one user identification and the determined location of the user with user identification information and location information received from a mobile device.

Hence, the circuitry uses a second information source, namely the mobile device, which provides user identification information and location information.

If the user, who generated the speech which is represented by the sound data and for which the location has been determined based on the sound data, is the same as identified by the user identification information received from the mobile device and if the location information received from the mobile device fits to the location determined for the user, then the user can be identified. In this case, it is assumed that the user wearing the mobile device is the same as the user who generates the speech (sound waves).

However, assuming that the user identification information received from the mobile device and/or the location information does not fit, then the user is not identified.

Thereby, it is possible to (securely) identify a user voicing a speech command, since a second source information (from a mobile device) is used for performing a check that the user is correctly identified. Moreover, this allows to distinguish different users/people also in cases where a speaker recognition alone might not be able to distinguish between two or more users/peoples.

The location determined by the apparatus may not be a point, but may have some dimension, e.g. it may be a small area, since the location determination may have an accuracy of multiple centimeters in some embodiments or even in the meter range (i.e. the location may be accurate on a centimeter or even meter basis). The same might be true for the location as identified by the location information from the mobile device. Also this location may only be accurate on a millimeter, centimeter or even meter basis. In particular, where the determined location and the location information may only be accurate on a meter basis, for example, different users wearing different mobiles may not be differentiated based on the location information and/or the determined information.

The user identification information and/or the location information may be directly received from the mobile device or it may be indirectly received from the mobile device. A direct receiving may be performed via a wireless or wired communication, as described herein, with the mobile device. An indirect receiving may involve communication with a third party service. For example, the mobile device may transmit the user identification information and/or the location information to the third party service from which the apparatus may obtain it.

In some embodiments, all users of the apparatus have their own mobile device, which provides user identification information and location information to the apparatus.

The mobile device may be a mobile device, such as a smartphone, mobile station, tablet computer, digital camera, intelligent glass, intelligent clock or any other electronic device which is mobile, or it may also be a wearable device, such as a wristband, neckband, electronic patch, or any other electronic device, which is wearable. In some embodiments, the mobile device is an (e.g. non-biometric) crypto wearable having a 'form-factor' providing a wristband.

The mobile device may be configured to determine a location and to provide location information being indicative of the determined location. The circuitry may be further configured to receive the location information.

In some embodiments, the mobile device may use GPS (global positioning system) or the like, and/or advanced indoor-location technology for estimating indoor location, e.g. location estimation using UWB (Ultra Wide Band), location estimation using magnetic/wifi fingerprinting, location estimation using IMU-based localization (IMU=inertial measurement unit), or any other technology for indoor location tracking, as generally known.

Generally, (geo-)magnetic fingerprinting uses the fact that the Earth's magnetic field is characteristically distorted by ferrous parts of, for example, buildings, e.g. in a room of a house.

In some embodiments, the mobile device may estimate its position using magnetic fingerprinting in such a way that, for example, the mobile device may take sample measurements of the geo-magnetic field or obtains respective magnetic information from another device and may compare them or this with a magnetic map of the corresponding area or building, as generally known.

Wifi fingerprinting works similarly: A wifi pattern (fingerprint) of an environment can be determined and stored such that at a later point in time, by determining the wifi pattern of the environment, the current location of the mobile device can be determined, as it is generally known.

In some embodiments, fingerprints may be taken by the mobile device, which include a plurality components for estimating location, such as a magnetic component, a wifi strength component, an auditory characteristics component, etc., which may be associated with a certain location and may be used for estimation of the user location, as generally known.

Ultra-wideband (UWB) radios may have relative bandwidths which are larger than usual, e.g. more than 500 MHz. A large bandwidth may improve reliability, as the signal typically contains different frequency components, whereby the probability is increased that some of the frequency components can go through or around obstacles and it may allow an improved ranging accuracy. The location estimation may involve detection of the angle of arrival, the signal strength, and/or time delay.

Various signal modulations may be used for UWB, such as pulse position modulation (PPM), on-off Keying (OOK), pulse amplitude modulation (PAM), and pulse width modulation (PWM), etc.

IMU-based localization may involve usage of a combination of accelerometers and gyroscopes and other sensors for estimating the location of the mobile device, as generally known.

The mobile device may be configured to determine or identify a user wearing the mobile device and to provide user identification information being indicative of the determined user. The circuitry may be further configured to receive the user identification information.

For example, the mobile device may be able to identify or authenticate its owner, e.g. by face recognition, finger print detection, inputting of a user password or the like, and/or the mobile device knows that it is worn (by the user), since it is able, for example, to detect when it is taken off (e.g. in the case of a wristband, opening of the bracelet can be detected, etc.).

The mobile device may also be able to authenticate its owner by frictionless authentication, which may in one embodiment involve using information from a variety of sources to build a context representing the user. For example, this may involve monitoring physiological parameters like heart rate, blood pressure, etc. and/or monitoring a user's habits, environment and/or behavior over a longer time and the like.

In some embodiments, a plurality of authentication techniques may be applied in combination to verify the user.

Furthermore, different authentication thresholds depending, for example, on the degree of confidentiality may be implemented for accessing different applications, services or devices. In some embodiments, a confidence level is calculated representing the confidence that the user is correctly identified, which may then be compared with the applicable authentication threshold. For instance, by increasing the authentication threshold, the probability that an impostor can pose as the user is reduced. Thus, in the case of higher confidentiality needs, a higher authentication threshold may be applied.

The mobile device may also be able to communicate with the apparatus, e.g. by wireless communication via a wireless local area network, via infrared, via Bluetooth or the like, or via a wire, e.g. a universal serial bus connection or the like.

The mobile device may be configured to receive a user input and to provide user input information. The circuitry may be further configured to receive the user input information for identifying the user.

For example, the mobile device may have an input sensor, touch sensor or the like, which, for example, is able to detect a touch event, such that a user may tap on the mobile, thereby making a user input.

In some embodiments, the circuitry is further configured to perform speech recognition. Thereby, a speech command spoken by the user may be understood and executed by the apparatus.

The circuitry may be further configured to communicate with the mobile device. As mentioned above, the circuitry may include an interface over which it can communicate wirelessly (e.g. wireless local area network, infrared, Bluetooth, or the like), or per wire (e.g. universal serial bus, firewire, or the like) with the mobile device, e.g. for receiving user identification information, location information, user input information, additional sound data or the like from the mobile device.

In some embodiments, additional sound data is generated via a microphone of the mobile device. Hence, the user may speak into the microphone of their mobile device, and the additional sound data generated via a microphone of the mobile device may be used for identifying the user either by the mobile device or by the apparatus. Accordingly, in one embodiment the additional sound data may be transmitted to the apparatus for identification of the user. In other embodiments, the mobile device may transmit information about the identified user to the apparatus. Thus, in some embodiments, the apparatus obtains two types of sound data, a first type e.g. generated based on its own microphone(s) and a second type received from the mobile device.

In some embodiments, the circuitry is further configured to request the user input information from the mobile device. As discussed above, the mobile device may be able to receive a user input, such that, for example, the apparatus may prompt the user to give an input into their mobile device, whereby the user can be identified.

In some embodiments, the circuitry is further configured to request face recognition data for identifying the user. Also thereby, the user may be identified. As mentioned, the apparatus may include a camera or the like, or a camera may be coupled to the apparatus, such that the user's face may be recognized when looking into the camera. Face recognition is generally known.

As also mentioned above, more than one user may be next to the apparatus, such that the apparatus may not be able to (securely) identify (or authenticate) the user based on the received sound signal and location information alone. Hence, the circuitry may receive a first location information from a first mobile device and a second location information from a second mobile device. In particular, where the determined location and the location information may only be accurate on a meter basis (or multiple centimeters), for example, different users wearing different mobiles may not be differentiated based on the first/second location information. Then, the circuitry may be further configured to request the user input, the face recognition and/or to speak into the microphone of the mobile device, when the first location information and the second location information represent the same location. By requesting a further identification information, e.g. the user input, the face recognition and/or speaking into the microphone of the mobile device, the user from which the speech in the sound data stems may be identified.

In some embodiments, for identifying the speaking user ("speaker"), the apparatus may combine different information from different sources, as discussed above, in order to improve the identification of the speaking user, i.e. the user whose speech is contained in the sound data.

Some embodiments pertain to a method including determining a location of a user, based on sound data representing speech of the user; and identifying the user based on the determined location of the user and user identification information and location information received from a mobile device, as also discussed above. The method may further include to associate at least one user identification with the determined location of the user, based on the sound data, and wherein the user is identified by comparing the at least one user identification and the determined location of the user with the user identification information and the location information received from the mobile device. The method may be performed by the apparatus (or its circuitry) as discussed herein, by a processor, computer, tablet computer, server, remote server, smartphone, or the like, or any other type of electronic device.

As discussed above, determining the location of the user may include determining a direction and/or a distance of the user. The method may further include performing speech recognition, as discussed above. The method may further include communicating with the mobile device, as discussed above. As discussed above, the mobile device may be configured to determine a location and to provide location information being indicative of the determined location, and the method may further include receiving the location information. As discussed above, the mobile device may be configured to determine or identify a user wearing the mobile device and to provide user identification information being indicative of the determined user, and the method may further include receiving the user identification information. Additional sound data may be generated via a microphone of the mobile device, as discussed above, which is used for identifying the user. The mobile device may be configured to receive a user input and to provide user input information; and the method may further include receiving the user input information for identifying the user, as discussed above. The method may further include requesting the user input information from the mobile device, as discussed. The method may further include requesting face recognition data for identifying the user, as discussed above.

The methods as described herein are also implemented in some embodiments as a computer program causing a computer and/or a processor and/or a circuitry to perform the method, when being carried out on the computer and/or processor and/or a circuitry. In some embodiments, also a non-transitory computer-readable recording medium is provided that stores therein a computer program product, which, when executed by a processor and/or a circuitry, such as the processor and/or a circuitry described above, causes the methods described herein to be performed.

Returning back to FIG. 1, an embodiment of an agent apparatus 1 (left side) is illustrated which communicates with a wearable device 2 (right side), which is a wristband 2 in the present embodiment. Without limiting the disclosure in that regard, in the following embodiments the disclosure is illustrated based on a mobile device, which is exemplary a wearable device.

Figure 2A:
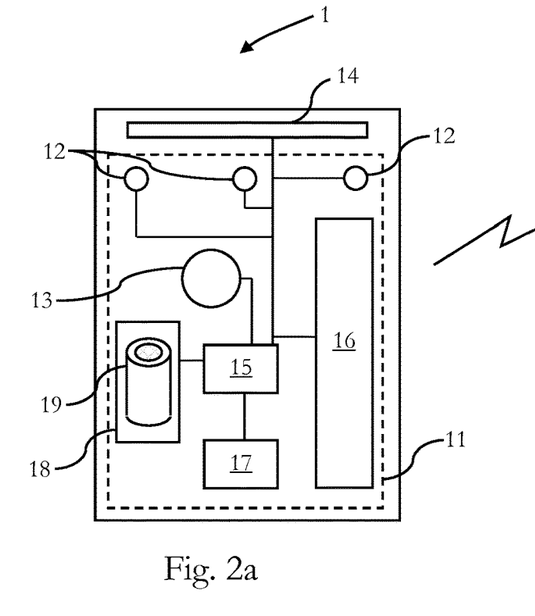

The agent apparatus 1 has circuitry 11, which is further illustrated in FIG. 2a and which is discussed in more detail further below.

The circuitry 11 has an array of microphones 12, wherein FIG. 1 exemplary illustrates three microphones 12, which are arranged in a defined distance to each other at a circumference of the agent apparatus 1, which has a cylindrical shape in the present embodiment, without limiting the present disclosure in that regard.

Moreover, a camera 13 is provided, which can take an image or video of a user in front of the camera 13, which in turn can be used for face recognition of the user. The camera 13 is CMOS based (complementary metal oxide semiconductor) in this embodiment, without limiting the present disclosure in that regard.

The agent apparatus 1 also has a loudspeaker 14 on the top for outputting sound, e.g. also for communicating with the user.

Figure 2B:
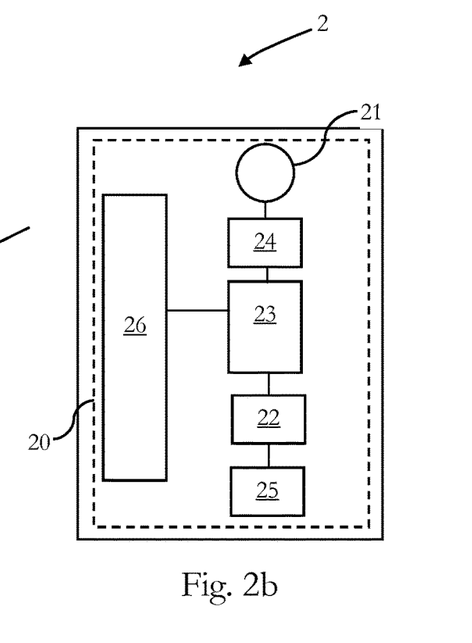

The wristband 2 has a circuitry 20, which has a microphone 21 and a touch sensitive area 22, i.e. a touch pad 22, for receiving user inputs when the user taps the touch pad 22. The circuitry 20 is illustrated in FIG. 2b and discussed in more detail further below.

The agent apparatus 1 and the wristband 2 can communicate via a wireless link, which can be provided over a wireless local area network, Bluetooth, or the like.

Moreover, the wristband 2 has a wristlet 23, which can be closed via two clasps 24a and 24b.

In the following, the circuitry 11 of the agent apparatus 1 is schematically described under reference of FIG. 2a.

The circuitry 11 also has a processor 15 (including one or more processors), which is coupled to the microphones 12, the camera 13, the loudspeaker 14, an interface 16, a random access memory (RAM) 17, and a storage 18 including a database 19, wherein the storage 18 is a hard disk in this embodiment, without limiting the disclosure in that regard.

In some embodiments, the agent apparatus 1 has additional input means, e.g. a keyboard, mouse, touch pad, or the like, and additional output means, e.g. a display, LEDs, or the like.

The interface 16 is able to perform communication over wire and wirelessly (Bluetooth and wireless local area network), such that it can communicate with the internet, a (home) network, electronic devices, such as the wristband 2, etc.

The database 19 may include information about users of the agent apparatus 1, e.g. in the form of user profiles, wherein for each user a own user profile is stored in the database 19.

The user profile includes user identification information, e.g. name, address, date of birth, and it includes voice characteristics for identifying the user, based on speaker recognition, as also discussed above.

In the following, the circuitry 20 of the wristband 2 is schematically described under reference of FIG. 2b.

The circuitry 20 has a processor 23 (including one or more processors), which is coupled to the microphone 21, to the touch pad 22, to a location sensor 24, a clasp sensor 25 and an interface 26.

The location sensor 24 is able to determine a location of the wristband 2. In the present example, it includes a GPS (global positioning sensor) and a UWB sensor for determining indoor location, as also discussed above, without limiting the present disclosure in the regard.

The clasp sensor 25 is able to detect, whether the two clasps 24a and 24b are closed or not, e.g. based on a magnetic force sensor or a mechanical sensor, as it is generally known.

The interface 26 is able to perform a wireless communication (Bluetooth and wireless local area network) and a wired communication, in this example over universal serial bus, without limiting the disclosure in that regard.

Thereby, the agent apparatus 1 and the wristband 2 can communicate wirelessly with each other (or via wire, if needed).

Figure 3:
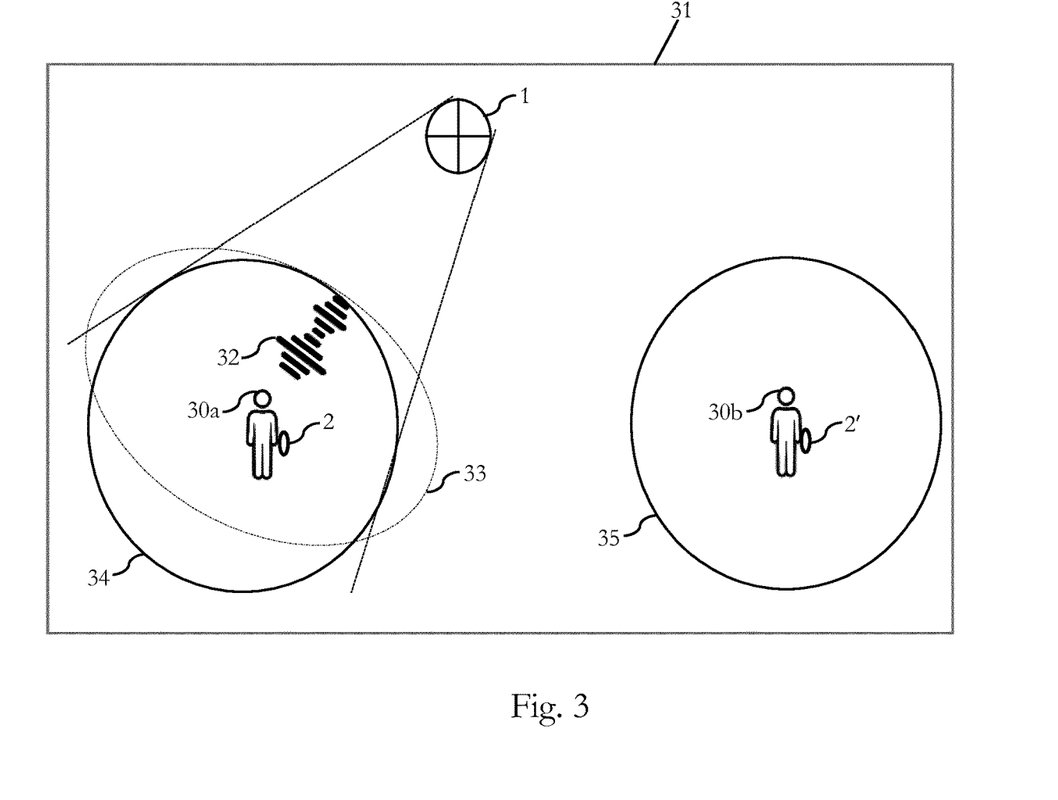
FIG. 3 illustrates a setup of use cases of the agent apparatus, and two users wearing a wearable device.
Figure 4:
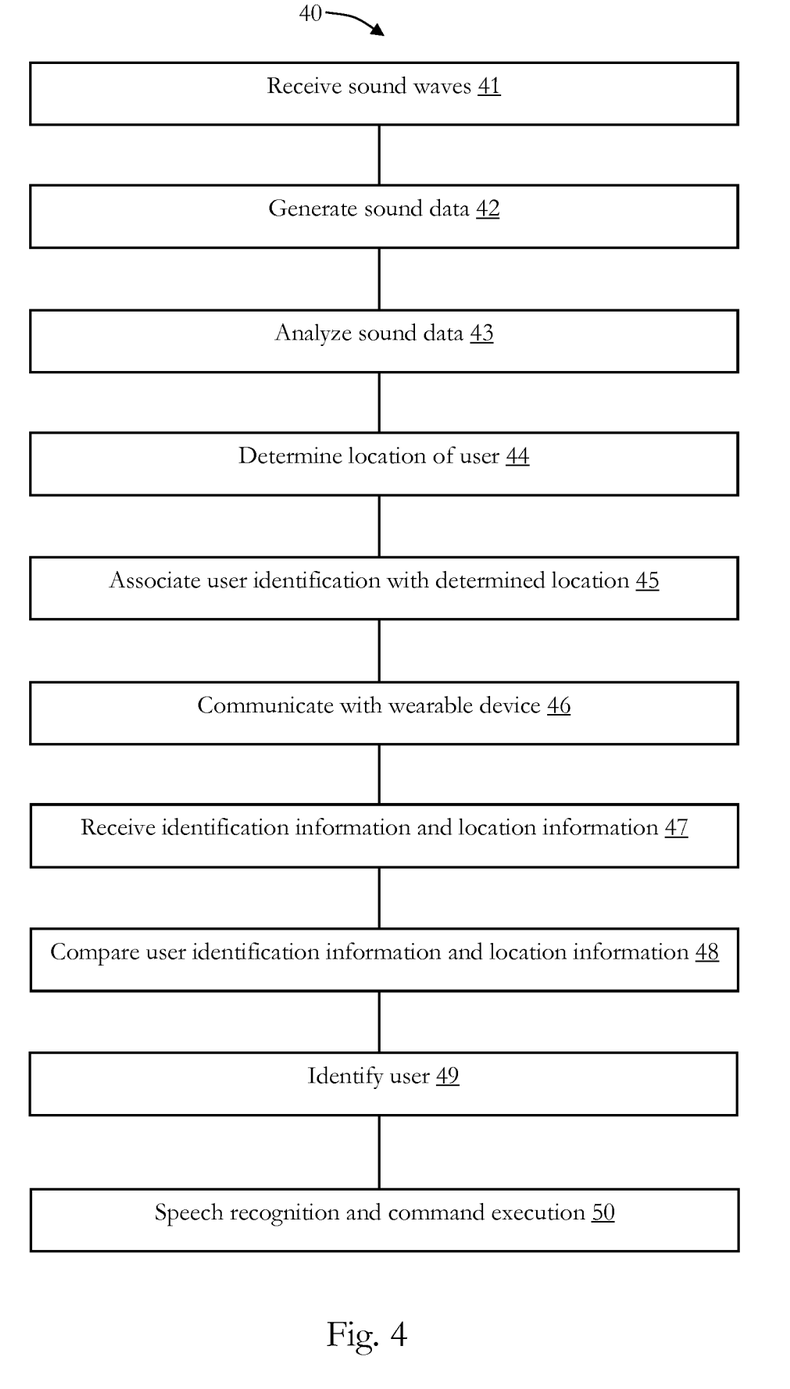
FIG. 4 is a flowchart of an embodiment of a method.

In the following, a typical setup of use cases of the agent apparatus 1 and two users 30a and 30b is discussed under reference of FIG. 3 and a method 40, which is performed by the agent apparatus 1 together with the wristband 2, is discussed under reference of FIG. 4.

The agent apparatus 1 is located within a room 31, wherein in the present example the two users 30a and 30b are distant from each other.

User 30a is the user who is speaking and says, for example, a command. Sound waves 32 generated by the user 30a travel through room 31 and will be detected by the agent apparatus 1 with the microphones 12, which receive the sound waves 32 at 41, wherein the circuitry 11 generates sound data at 42 based on the sound waves 32, which, thus, also include the speech command spoken by user 30a.

The circuitry 11 analyzes the sound data at 43, for finding voice characteristics in the sound data or a voice pattern and compares this with voice characteristics stored in user profiles stored in the database 19.

In the present example, two user identifications, namely of user 30a and of user 30b are found in the database 19 matching the voice characteristics found in the sound data.

At 44, the agent apparatus 1 determines a location 33 of the user 30a, based on the received sound waves, by determining the direction of the sound waves 32 and the distance of the user 30a, as also discussed above.

At 45, the agent apparatus 1 associates the two user identifications of users 30a and 30b with the location 33, which it has determined at 44. As discussed above, as the location determination has some uncertainty, the location 33 has some dimension, which is illustrated by the elliptic line 33 surrounding an area having a diameter of roughly two meters.

The user 30a wears the wearable device 2, described above, and the user 30b wears a wearable device 2', which corresponds to wearable device 2 from a technical point of view.

At 46, the agent apparatus 1 wirelessly communicates with the wearable devices 2 and 2'.

At 47, the agent apparatus 1 receives location information and user identification information from the wearable devices 2 and 2'. In this embodiment, the agent apparatus 1 and the wearable devices 2 and 2' communicate periodically with each other. However, in other embodiments, the agent apparatus 1 may send a request to the wearable device registered in the database 19 in order to receive the user identification information and/or the location information.

The wearable device 2 of user 30a, who is generating the sound waves 32, determines its location 34, which also has some dimension (e.g. also roughly two meters diameter), due to lack of accuracy. But, as can be taken from FIG. 3, the location 33 determined by the agent apparatus 1 and the location 34 determined by the wearable device 2 overlap.

The wearable device 2' of user 30b determines its location 35, which also has some dimension (e.g. roughly two meters diameter), due to lack of accuracy. But, as can be taken from FIG. 3, the location 33 determined by the agent apparatus 1 and the location 35 determined by the wearable device 2' do not overlap.

At 48, the agent apparatus 1 compares the two user identifications found at 43 and the location of the user 30a determined at 44 with the user identifications and the location information received at 47 with each other.

Thereby, the agent apparatus 1 will determine that the determined user identification and the determined location information of user 30a matches with the user identification and the location represented by the location information received from the wearable device 2.

Thus, thereby, the user 30a is identified as the user who is voicing or giving the speech command which is included in the sound data generated at 42, based on the sound waves 32 received at 41.

At 50, the agent apparatus 1 performs speech recognition and executes the command included in the sound data, based on the performed speech recognition.

In the following, five use case scenarios by using the agent apparatus 1 and at least one wearable device 2, as described above, and with the general setup of FIG. 3, as described above, will be described under reference of FIGS. 5 to 9.

Figure 5:
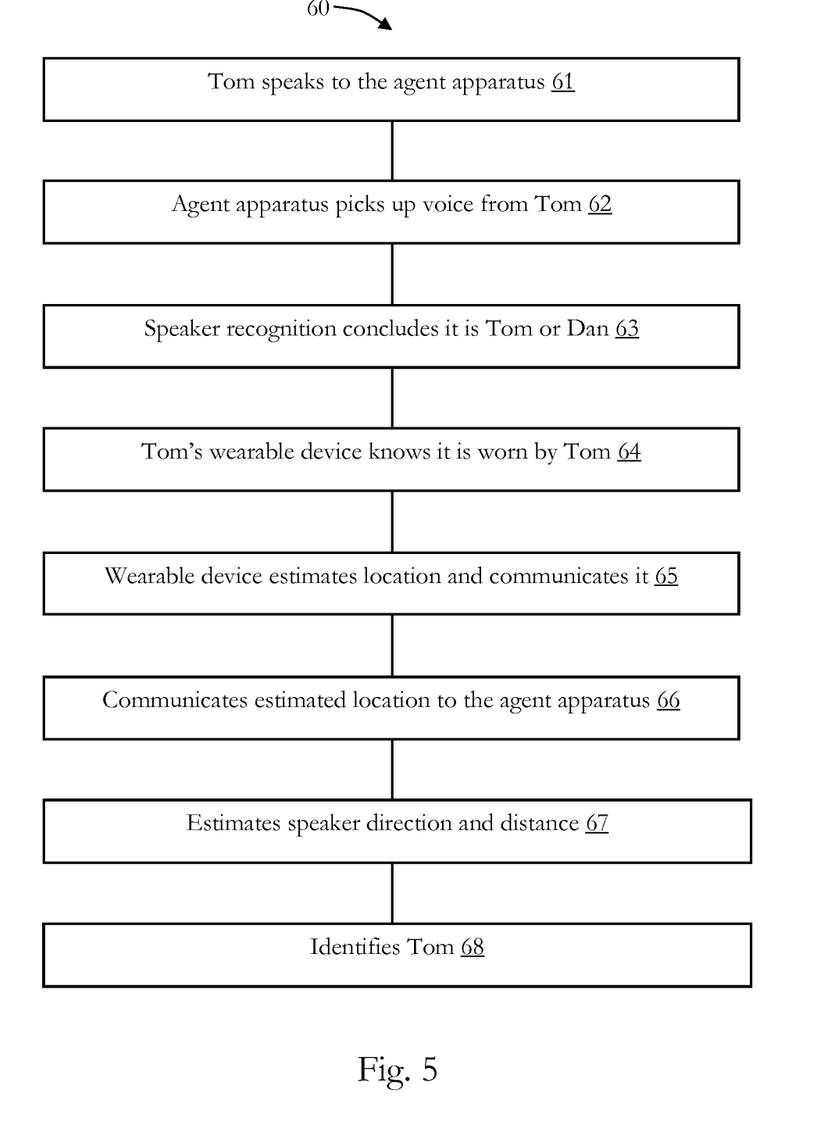
FIG. 5 is a flowchart illustrating the method of FIG. 4 for a use case scenario.

FIG. 5 shows a method 60, which may be performed by the agent apparatus 1 and the wearable devices 2 and 2'.

At 61, the user 30*a* (FIG. 3), referred to as "Tom", speaks to the agent apparatus 1, thereby producing sound waves 32.

At 62, the agent apparatus 1 picks up the voice from Tom by receiving the sound waves 32, as discussed above.

At 63, the agent apparatus 1 speaker recognition concludes that it is Tom (user 30*a*) or Dan (user 30*b*, FIG. 3), i.e. it cannot conclude that it is Tom, since, for example, the voice characteristics of Dan and Tom are too similar to each other, or for other reasons.

Tom is wearing a wearable device 2 (FIG. 2). At 64, Tom's wearable device 2 knows that it is worn by Tom, since, for example, the clasp sensor 25 detects that clasps 24*a* and 24*b* are closed. Moreover, Tom is registered as user for the wearable device 2 and Tom, for example, may have authenticated himself, when he put on the wearable device 2, by inputting a code or the like.

At 65, Tom's wearable device 2 has estimated his location 34 (FIG. 3) and communicates this to the agent apparatus 1.

At 66, also Dan's wearable device 2' estimated the location of Dan and communicates this estimated location to the agent apparatus 1.

At 67, the agent apparatus 1 estimated the speaker direction and distance from the captured sound using its microphone array 12 and thereby estimated the user location 33, as discussed above under reference of FIG. 3.

At 68, by comparing the locations estimated by the agent apparatus 1 and the two wearable devices 2 and 2', the agent apparatus 1 identifies Tom as user 30*a* who is speaking.

Figure 6:
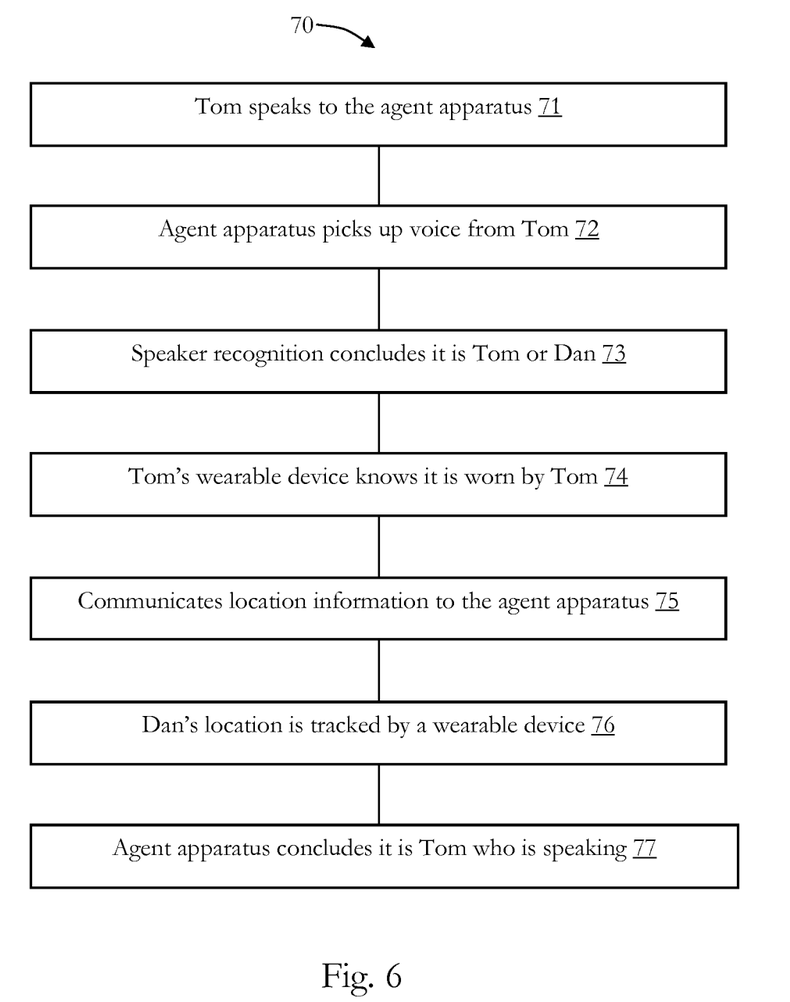
FIG. 6 is a flowchart illustrating the method of FIG. 4 for a use case scenario.

FIG. 6 shows a method 70, which may be performed by the agent apparatus 1 and the wearable devices 2 and 2'.

At 71, Tom (user 30*a*, FIG. 3) speaks to the agent apparatus 1, as discussed above, thereby generating sound waves 32.

At 72, the agent apparatus 1 picks up voice data from Tom via its microphones 12, as discussed above.

At 73, agent apparatus 1 speaker recognition concludes it is Tom or Dan (user 30*b*, FIG. 3), as discussed above.

At 74, Tom is wearing the wearable device 2 and Tom's wearable device knows it is worn by Tom, as discussed above.

At 75, Tom's wearable device knows it is in the room 31, as discussed above, and communicates the respective location information to the agent apparatus 1.

At 76, Dan is not in the room, but Dan's location is being tracked by his wearable device 2' which communicates its location to the agent apparatus 1 (e.g. through a third party cloud service), as discussed above.

At 77, based on the steps above, the agent apparatus 1 concludes that it is Tom who is speaking.

Figure 7:
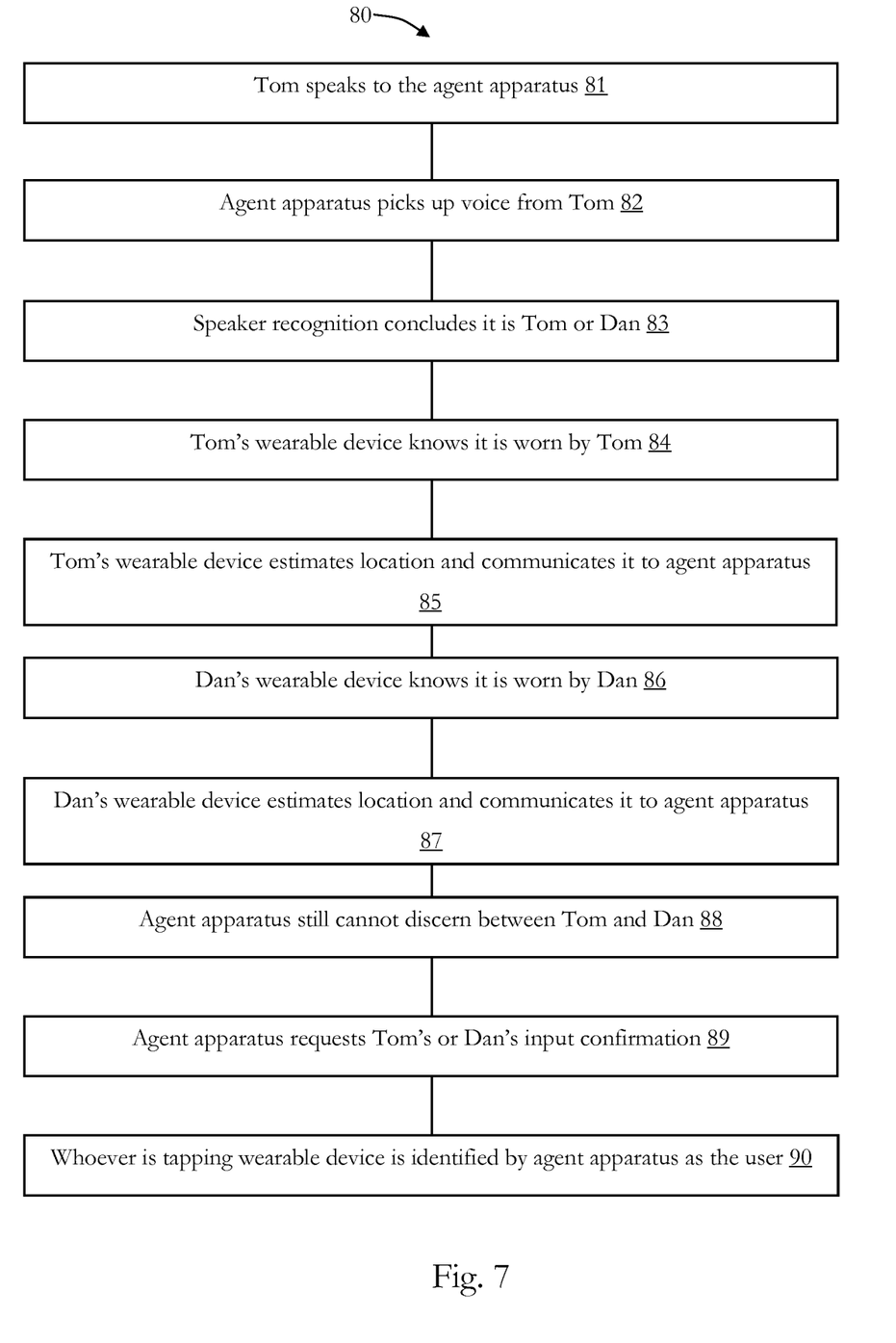
FIG. 7 is a flowchart illustrating the method of FIG. 4 for a use case scenario.

FIG. 7 shows a method 80, which may be performed by the agent apparatus 1 and the wearable devices 2 and 2'.

At 81, Tom (user 30*a*, FIG. 3) speaks to the agent apparatus 1, thereby generating sound waves 32, as discussed above.

At 82, agent apparatus 1 picks up voice data from Tom, as discussed above.

At 83, the agent apparatus 1 speaker recognition concludes it is Tom or Dan, i.e. cannot conclude it is Tom, as discussed above.

At 84, Tom is wearing the wearable device 2, wherein Tom's wearable device knows it is worn by Tom, as discussed above.

At 85, Tom's wearable device estimated its location 34 and communicates this to the agent apparatus 1.

In this scenario, Dan (user 30*b*, FIG. 3) is standing close to Tom, such that the locations (location areas) determined by the respective wearable devices 2 and 2' overlap.

At 86, Dan is wearing the wearable device 2', wherein Dan's wearable device knows it is worn by Dan, as discussed above.

At 87, Dan's wearable device estimated its location 35 and communicates this to the agent apparatus 1, as discussed above.

At 88, based on the steps above, the agent apparatus 1 still cannot discern between Tom and Dan, since their estimated locations 34 and 35 overlap.

At 89, the agent apparatus 1 asks for Tom's (or Dan's) confirmation through the wearable device, e.g. by letting Tom/Dan tap the wearable device 2 (or 2').

At 90, the person/user, who is tapping the wearable device (2 or 2') will be identified by the agent apparatus 1 as the user who has spoken.

In some embodiments, the location determination of the wearable device may not be needed, e.g. by just asking the users to, for example, tap the wearable device for identifying the user.

Figure 8:
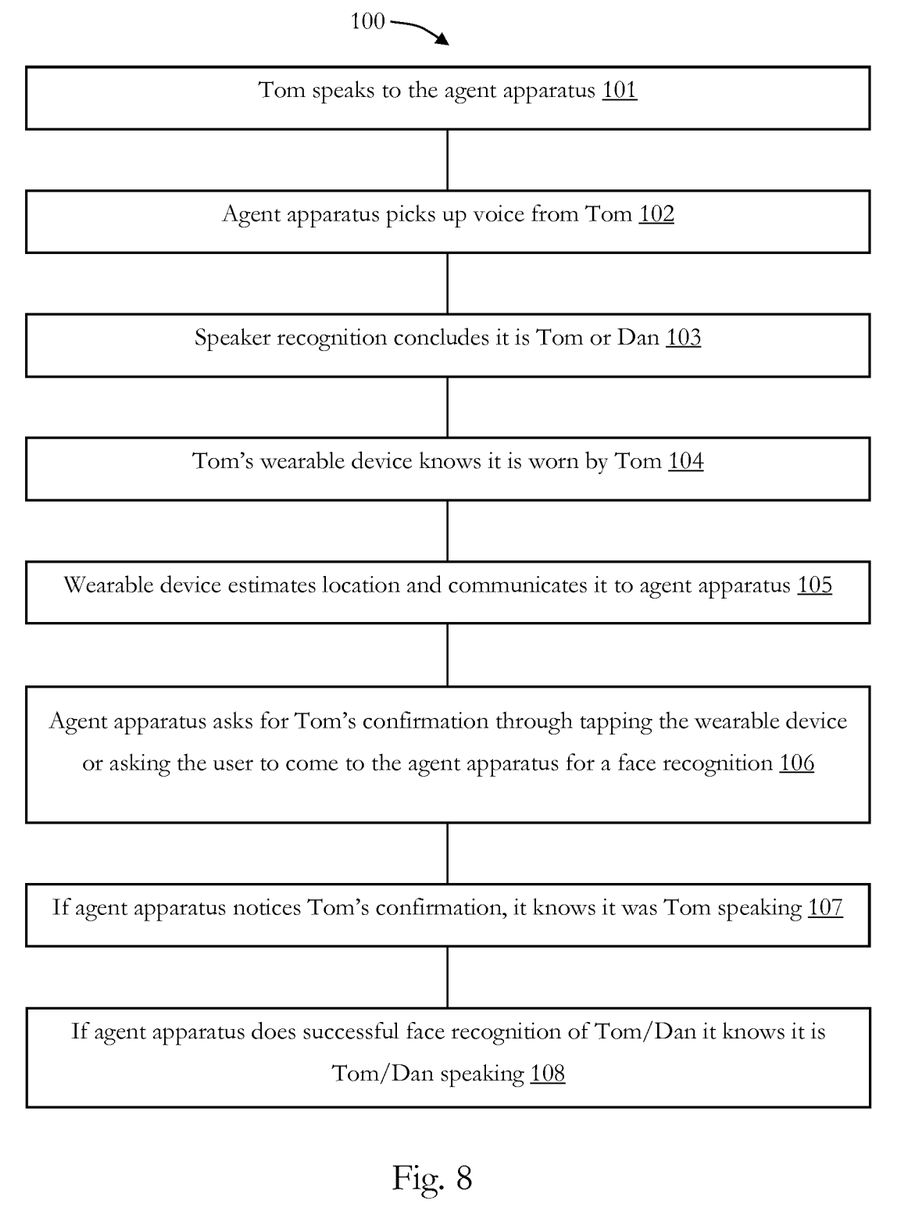
FIG. 8 is a flowchart illustrating the method of FIG. 4 for a use case scenario.

FIG. 8 shows a method 100, which may be performed by the agent apparatus 1 and the wearable devices 2 and 2'.

At 101, Tom (user 30*a*, FIG. 3) (or Dan, user 30*b*, FIG. 3) speaks to the agent apparatus 1, thereby generating sound waves 32, as discussed above.

At 102, the agent apparatus 1 picks up voice data from Tom (or Dan), as discussed above.

At 103, the agent apparatus 1 speaker recognition concludes it is Tom or Dan, i.e. cannot conclude that it is Tom, as discussed above.

At 104, Tom is wearing a wearable device 2, wherein Tom's wearable device 2 knows that it is worn by Tom, as discussed above.

At 105, Tom's wearable device 2 estimates its location and communicates this to the agent apparatus 1, as discussed above.

In this scenario, Dan (user 30*b*) is not in the room 31 and Dan is not wearing his wearable device 2', such that the agent apparatus 1 has no knowledge about Dan's location.

Hence, in this case, at 106, the agent apparatus 1 will ask for Tom's confirmation through, for example, tapping the wearable device 2, as discussed above, or the agent apparatus 1 asks the (yet unknown) user to come to the agent apparatus 1 for a face recognition performed with the camera 23, as discussed above.

At 107, if the agent apparatus 1 notices Tom's confirmation by tapping the wearable device 2, it knows that it was Tom speaking.

At 108, if the agent apparatus 1 performs a successful face recognition of Tom or Dan it knows that it was Tom or Dan speaking.

Thereby, the speaking user (Tom or Dan) can be correctly identified.

Figure 9:
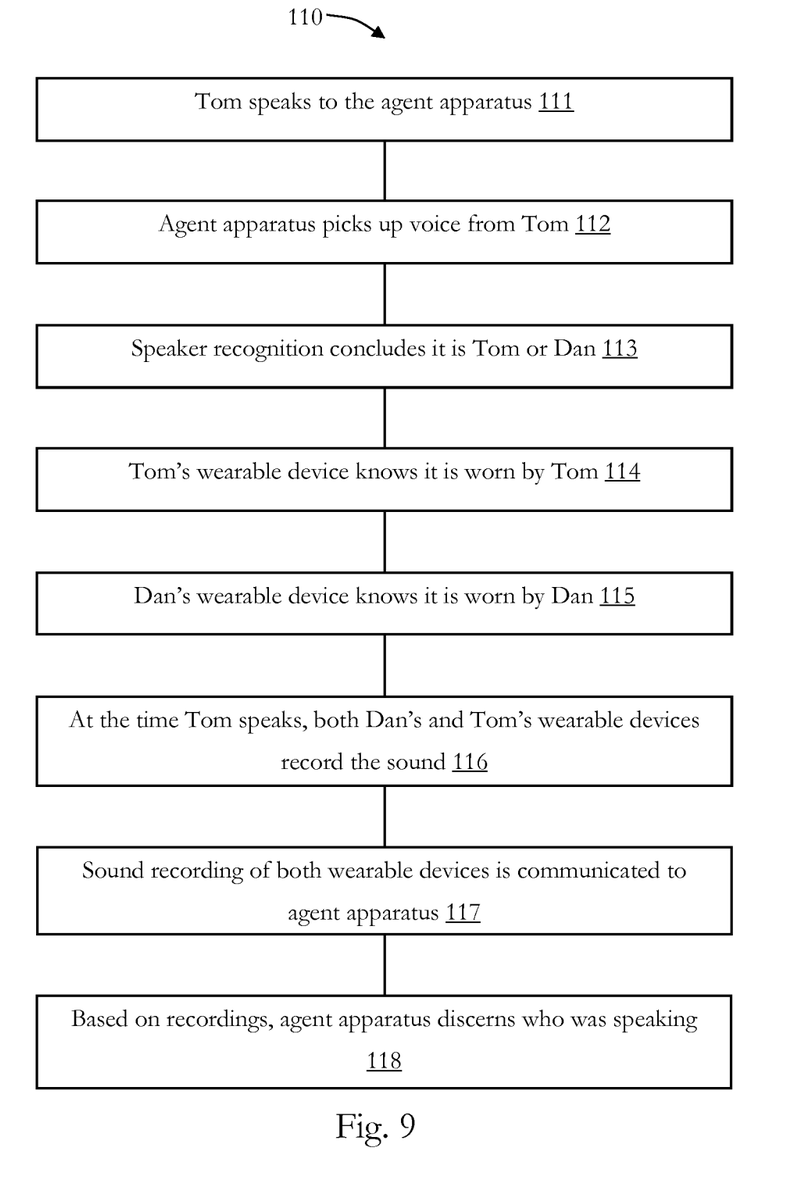
FIG. 9 is a flowchart illustrating the method of FIG. 4 for a use case scenario.

FIG. 9 shows a method 110, which may be performed by the agent apparatus 1 and the wearable devices 2 and 2'.

At 111, Tom (user 30*a*) speaks to the agent apparatus 1, thereby generating sound waves 32, as discussed above.

At 112, the agent apparatus 1 picks up voice data from Tom, as discussed above.

At 113, the agent apparatus 1 speaker recognition concludes it is Tom or Dan, i.e. cannot conclude that it is Tom, as discussed above.

At 114, Tom is wearing the wearable device 2, wherein Tom's wearable knows it is worn by Tom, as discussed above.

In this scenario, Dan is also in the room and is wearing the wearable device 2', wherein Dan's wearable device 2' knows it is worn by Dan at 115.

In this scenario, both Tom's and Dan's wearable devices 2 and 2', respectively, each have a microphone (12, FIG. 2*b*).

At the time Tom speaks, both Dan's and Tom's wearable devices 2 and 2', respectively, record the sound (voice) at 116.

At 117, the sound recording of both wearable devices 2 and 2' is communicated to the agent apparatus 1 as additional sound data.

At 118, based on these sound recordings, i.e. the additional sound data, the agent apparatus 1 may be able to discern who was speaking.

For instance, if there is a (large) difference in volume, e.g. above a predefined threshold value, of the recorded sound that corresponds to the spoken voice, the agent apparatus 1 can discern that the person wearing the wearable device and having the highest volume of the recorded voice is the speaker.

It should be recognized that the embodiments describe methods with an exemplary ordering of method steps. The specific ordering of method steps is however given for illustrative purposes only and should not be construed as binding. For example, the ordering of 45 and 46 in the embodiment of FIG. 4 may be exchanged. Also, the ordering of 63, 64 and 65 in the embodiment of FIG. 5 may be exchanged. Further, also the ordering of 73 and 74 in the embodiment of FIG. 6 may be exchanged. Other changes of the ordering of method steps may be apparent to the skilled person.

Please note that the division of the circuitry 11 into units 15 to 19 is only made for illustration purposes and that the present disclosure is not limited to any specific division of functions in specific units. For instance, the circuitry 11 could be implemented by a respective programmed processor, field programmable gate array (FPGA), and the like.

The methods described herein can also be implemented as a computer program causing a computer and/or a processor and/or circuitry, such as processor 15 or 23 and/or circuitry 11 or 21 discussed above, to perform the method, when being carried out on the computer and/or processor and/or circuitry. In some embodiments, also a non-transitory computer-readable recording medium is provided that stores therein a computer program product, which, when executed by a processor, such as the processor described above, causes the method described to be performed.

All units and entities described in this specification and claimed in the appended claims can, if not stated otherwise, be implemented as integrated circuit logic, for example on a chip, and functionality provided by such units and entities can, if not stated otherwise, be implemented by software.

In so far as the embodiments of the disclosure described above are implemented, at least in part, using software-controlled data processing apparatus, it will be appreciated that a computer program providing such software control and a transmission, storage or other medium by which such a computer program is provided are envisaged as aspects of the present disclosure.

Note that the present technology can also be configured as described below.

(1) An apparatus comprising circuitry configured to:
determine a location of a user, based on sound data representing speech of the user; and
identify the user based on the determined location of the user and user identification information and location information received from a mobile device.

(2) The apparatus of (1), wherein the circuitry is further configured to associate at least one user identification with the determined location of the user, based on the sound data, and wherein the user is identified by comparing the at least one user identification and the determined location of the user with the user identification information and the location information received from the mobile device.

(3) The apparatus of (1) or (2), wherein determining the location of the user includes determining at least one of a direction and a distance of the user.

(4) The apparatus of anyone of (1) to (3), wherein the circuitry is further configured to communicate with the mobile device.

(5) The apparatus of anyone of (1) to (4), wherein the mobile device is configured to determine a location and to provide location information being indicative of the determined location, and wherein the circuitry is further configured to receive the location information.

(6) The apparatus of anyone of (1) to (5), wherein the mobile device is configured to identify a user wearing the mobile device and to provide user identification information being indicative of the determined user, and wherein the circuitry is further configured to receive the user identification information.

(7) The apparatus of anyone of (1) to (6), wherein additional sound data generated via a microphone of the mobile device is used for identifying the user.

(8) The apparatus of anyone of (1) to (7), wherein the mobile device is configured to receive a user input and to provide user input information, and wherein the circuitry is further configured to receive the user input information for identifying the user.

(9) The apparatus of anyone of (1) to (8), wherein the circuitry is further configured to request the user input information from the mobile device.

(10) The apparatus of anyone of (1) to (9), wherein the circuitry is further configured to request face recognition data for identifying the user.

(11) A method comprising:
determining a location of a user, based on sound data representing speech of the user; and
identifying the user based on the determined location of the user and user identification information and location information received from a mobile device.

(12) The method of (11), wherein the method further comprises associating at least one user identification with the determined location of the user, based on the sound data, and wherein the user is identified by comparing the at least one user identification and the determined location of the user with the user identification information and the location information received from the mobile device.

(13) The method of (11) or (12), wherein determining the location of the user includes determining at least one of a direction and a distance of the user.

(14) The method of anyone of (11) to (13), wherein the method further comprises communicating with the mobile device.

(15) The method of anyone of (11) to (14), wherein the mobile device is configured to determine a location and to provide location information being indicative of the determined location, and wherein the method further comprises receiving the location information.

(16) The method of anyone of (11) to (15), wherein the mobile device is configured to identify a user wearing the mobile device and to provide user identification information being indicative of the determined user, and wherein the method further comprises receiving the user identification information.

(17) The method of anyone of (11) to (16), wherein additional sound data generated via a microphone of the mobile device is used for identifying the user.

(18) The method of anyone of (11) to (17), wherein the mobile device is configured to receive a user input and to provide user input information, and wherein the method further comprises receiving the user input information for identifying the user.

(19) The method of anyone of (11) to (18), wherein the method further comprises requesting the user input information from the mobile device.

(20) The method of anyone of (11) to (19), wherein the method further comprises requesting face recognition data for identifying the user.

(21) A computer program comprising program code causing a computer to perform the method according to anyone of (11) to (20), when being carried out on a computer.

(22) A non-transitory computer-readable recording medium that stores therein a computer program product, which, when executed by a processor, causes the method according to anyone of (11) to (20) to be performed.

The invention claimed is:

1. An apparatus comprising circuitry configured to:
receive sound waves emitted by a user saying a command;
generate sound data based on the sound waves;
determine a location of the user, based on the sound data;
associate at least one user identification found in a database with the determined location of the user;
receive user identification information and location information from a mobile device; and
identify the user by comparing the at least one user information found in the database and the determined location of the user based on the sound data with the user identification information and the location information received from the mobile device.

2. The apparatus of claim 1, wherein the mobile device is configured to identify a user wearing the mobile device.

3. The apparatus of claim 1, wherein determining the location of the user includes determining at least one of a direction and a distance of the user.

4. The apparatus of claim 1, wherein the circuitry is further configured to communicate with the mobile device performed via a wireless or a wired communication.

5. The apparatus of claim 1, wherein the mobile device is configured to determine a location and to provide the location information being indicative of the determined location on a centimeter or meter basis.

6. The apparatus of claim 1, wherein the mobile device is configured to identify a user wearing the mobile device and to provide user identification information being indicative of the determined user based on a user name, date of birth, place of birth or gender of the user, and wherein the circuitry is further configured to receive the user identification information based on a user name, date of birth, place of birth or gender of the user.

7. The apparatus of claim 1, wherein additional sound data generated via a microphone of the mobile device is used for identifying the user.

8. The apparatus of claim 1, wherein the mobile device is configured to receive a user input and to provide user input information, and wherein the circuitry is further configured to receive the user input information for identifying the user.

9. The apparatus of claim 8, wherein the circuitry is further configured to request the user input information from the mobile device.

10. The apparatus of claim 1, wherein the circuitry is further configured to request face recognition data for identifying the user.

11. A method comprising:
receiving sound waves emitted by a user saying a command;
generating sound data based on the sound waves;
determining a location of the user, based on the sound data;
associating at least one user identification found in a database with the determined location of the user;
receiving user identification and location information from a mobile device; and
identifying the user by comparing the at least one user information found in the database and the determined location of the user based on sound data with the user identification information and the location information received from the mobile device.

12. The method of claim 11, wherein the mobile device is configured to identify a user wearing the mobile device.

13. The method of claim 11, wherein determining the location of the user includes determining at least one of a direction and a distance of the user.

14. The method of claim 11, wherein the method further comprises communicating with the mobile device performed via a wireless or a wired communication.

15. The method of claim 11, wherein the mobile device is configured to determine a location and to provide the location information being indicative of the determined location on a centimeter or meter basis.

16. The method of claim 11, wherein the mobile device is configured to identify a user wearing the mobile device to provide user identification information being indicative of the determined user based on a user name, date of birth, place of birth or gender of the user, and wherein the method further comprises receiving the user identification information based on a user name, date of birth, place of birth or gender of the user.

17. The method of claim 11, wherein additional sound data generated via a microphone of the mobile device is used for identifying the user.

18. The method of claim 11, wherein the mobile device is configured to receive a user input and to provide user input information, and wherein the method further comprises receiving the user input information for identifying the user.

19. The method of claim 18, wherein the method further comprises requesting the user input information from the mobile device.

20. The method of claim 11, wherein the method further comprises requesting face recognition data for identifying the user.

* * * * *